United States Patent
Sato (10) Patent No.: US 8,446,424 B2
(45) Date of Patent: *May 21, 2013

(54) IMAGE PROCESSING APPARATUS AND IMAGE PROCESSING METHOD

(75) Inventor: Yoshinobu Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/540,742

(22) Filed: Jul. 3, 2012

(65) Prior Publication Data

US 2012/0269490 A1    Oct. 25, 2012

Related U.S. Application Data

(63) Continuation of application No. 11/442,316, filed on May 30, 2006, now Pat. No. 8,248,429.

(30) Foreign Application Priority Data

May 31, 2005   (JP) ................. 2005-159939

(51) Int. Cl.
G09G 5/02   (2006.01)

(52) U.S. Cl.
USPC ........................................ 345/589; 345/660

(58) Field of Classification Search ............... 345/589, 345/660

See application file for complete search history.

(56) References Cited

U.S. PATENT DOCUMENTS

| | | |
|---|---|---|
| 5,929,837 A | 7/1999 | Hasz et al. |
| 6,614,486 B2 | 9/2003 | Hu |
| 7,110,025 B1 | 9/2006 | Loui et al. |
| 7,382,972 B2 | 6/2008 | Nakayama |
| 8,248,429 B2 | 8/2012 | Sato |
| 2004/0179241 A1 | 9/2004 | Saitoh |
| 2004/0234164 A1 | 11/2004 | Kaji |
| 2004/0263651 A1 | 12/2004 | Kazunobu et al. |
| 2005/0062755 A1 | 3/2005 | Van Dyke et al. |
| 2005/0094000 A1 | 5/2005 | Son et al. |
| 2005/0174457 A1 | 8/2005 | Yoshino et al. |
| 2005/0206784 A1 | 9/2005 | Li et al. |
| 2006/0012616 A1 | 1/2006 | Paek |

FOREIGN PATENT DOCUMENTS

| | | |
|---|---|---|
| JP | 07-322295 A | 12/1995 |
| JP | 2001-359117 A | 12/2001 |
| JP | 2003-087640 A | 3/2003 |
| JP | 2004-112579 A | 4/2004 |
| JP | 2005-092203 A | 4/2005 |

*Primary Examiner* — Maurice L McDowell, Jr.

(74) *Attorney, Agent, or Firm* — Fitzpatrick, Cella, Harper & Scinto

(57) ABSTRACT

An image processing apparatus and method converts a moving image signal into an image data format consisting of a luminance signal and a color-difference signal like that of the YUV format at a signal processing circuit 4, compression-encodes the image data at a compression circuit 10 and records it on a recording medium 11, in addition to reducing the same-format image data color-difference signal to generate image data for display, enabling the image processing apparatus for recording a moving image to achieve moving image recording of a quality that is good enough to be used as still images.

22 Claims, 10 Drawing Sheets

SIGNAL PROCESSING CIRCUIT 4 OUTPUT

RECORDING SIZE

DISPLAY SIZE

SIGNAL PROCESSING CIRCUIT 4 OUTPUT

RECORDING SIZE

DISPLAY SIZE

IMAGE PROCESSING APPARATUS AND IMAGE PROCESSING METHOD

This application is a continuation of Application No. 11/442,316 filed May 30, 2006.

FIELD OF THE INVENTION

The present invention relates to an image processing apparatus and image processing method for recording moving image data, and more particularly, to an image processing apparatus and image processing method capable of recording moving images in consideration of a possible use of the recorded moving images as still images.

BACKGROUND OF THE INVENTION

At present, the printing of still images sensed using a digital camera or the like is common. Moreover, it is also possible to print moving images sensed with a digital camera and the like, in which case one desired frame from among the recorded images is extracted and a print made based on such single frame still image.

However, moving images sensed with a digital camera or the like usually have a resolution of 640 pixels horizontally× 480 lines vertically (VGA—Video Graphics Array), which is not a high enough resolution for printing as a good quality still image. In addition, since the moving images are assumed to be viewed on a display, the color bandwidth of the video signal is limited when recorded. As a result, the color bandwidth of the single-frame still image extracted from the moving image-recorded video signals also is reduced by band limitation, so that the quality of the picture is poor not only in terms of the resolution (the number of pixels) but also in terms of the amount of color information. Therefore, moving images are generally unsuitable for purposes of printing. In order to print moving images of high picture quality, it is necessary to record at high resolution with a wideband color signal.

Japanese Patent Application Laid-Open No. 07-322295 proposes transmitting an RGB still image signal in addition to a band-limited YUV moving image signal along a transmission path for transmitting band-limited moving images, enabling an image output device such as a video printer to obtain a high quality still image by separating out the still image signal.

In addition Japanese Patent Application Laid-Open No. 2001-359117 proposes inputting an image signal containing color signals and a luminance signal from an image input unit and, if the image signal is a moving image, first, reducing the data amount of the color-difference signal of the image signal and compressing it together with the luminance signal, and then shifting up and encoding a designated area in the image so as to improve the picture quality of the designated area.

However, because the video signal transmission apparatus described in Japanese Patent Application Laid-Open No. 0.7-322295 transmits a still image signal composed of component video signals in addition to the band-limited moving image signal, transmission volume increases and thus requires a wideband memory bus. Therefore, if the bandwidth of the memory bus is narrow, at video signal transmission the band of memory bus may be overloaded, leading in the worst case to a loss of transmission. When that happens, the image compression ratio increases and the amount of data of the video signal to be transmitted is reduced, leading to the same deterioration in picture quality that is a problem with the conventional art.

In addition, with the image processing apparatus described in Japanese Patent Application Laid-Open No. 2001-359117, an image of high picture quality is generated by shifting up and encoding a designated area of the image. As a result, however, the remainder of the image is not of high quality and thus the same problem that exists in the conventional art remains, meaning that the picture quality is not good enough for output to a color printer as a still image.

Moreover, since a high quality image is output to a display device at the same time as a high quality moving image is recorded, the band of the memory bus is overloaded at video signal transmission. As a result, the same problem arises as with the video signal transmission apparatus of Japanese Patent Application Laid-Open No. 07-322295

SUMMARY OF THE INVENTION

The present invention is conceived in light of the above-described circumstances, and has as its object to provide an image processing apparatus and image processing method capable of recording high quality moving images.

According to an aspect of the present invention, there is provided an image processing apparatus for recording a moving image, comprising: signal processing unit adapted to convert an input moving image signal into first image data composed of a luminance signal and a color-difference signal and outputting the first image data; encoding unit adapted to encode the first image data frame by frame and outputting the first image data as compressed image data; recording unit adapted to sequentially record the compressed image data as moving image data on a recording medium; and conversion unit adapted to convert the first image data into second image data having a reduced color-difference signal data amount and outputting the second image data as image data for display.

According to another aspect of the present invention, there is provided an image processing method for recording a moving image, comprising: a signal processing step of converting an input moving image signal into first image data composed of a luminance signal and a color-difference signal and outputting the first image data; an encoding step of compression encoding the first image data frame by frame and outputting the first image data as compressed image data; a recording step of recording the compressed image data as moving image data in order on a recording medium; and a conversion step of converting the first image data into second image data having a reduced color-difference signal data amount and outputting the second image data as image data for display.

With such a structure, the present invention enables a high quality moving image to be recorded, making it possible to obtain a still image of high picture quality compared to the conventional art even if a given frame from the moving image is used as a still image.

Other features and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

(First Embodiment)

Figure 1:
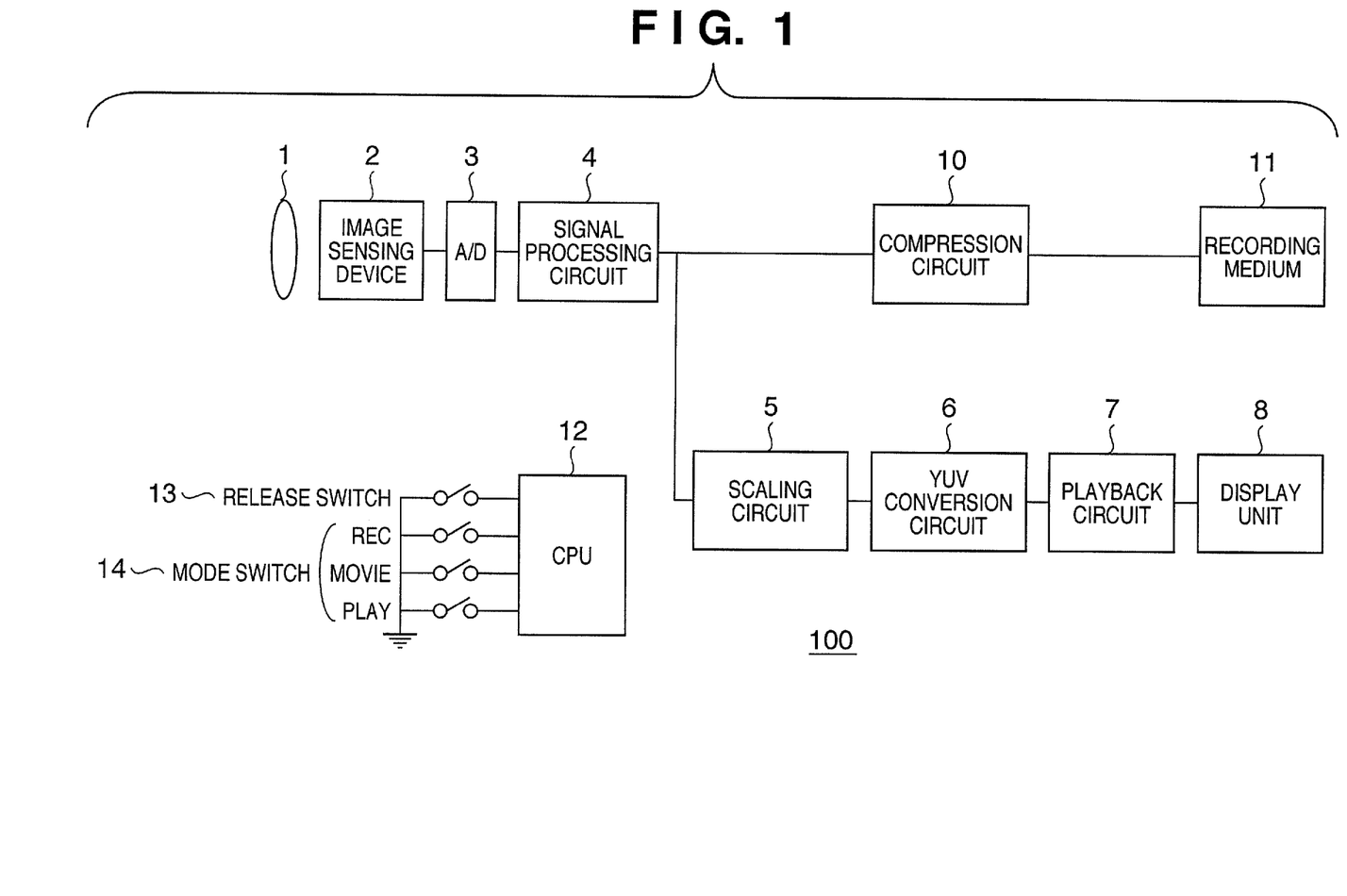
FIG. 1 is a block diagram showing an example of the structure of a digital camera as an image processing apparatus according to a first embodiment of the present invention.

FIG. 1 is a block diagram showing an example of the structure of a digital camera 100 as an image processing apparatus according to a first embodiment of the present invention.

In FIG. 1, an image sensing lens 1 is, for example, a zoom lens equipped with an auto focus mechanism. An image sensing device 2 is, for example, a one-chip CCD (Charge Coupled Device). An A/D converter 3 converts an analog signal output by the image sensing device 2 into a digital signal. A signal processing circuit 4 contains a white balance adjustment circuit, a gamma correction circuit, a YC processing circuit, an exposure/focus (AE/AF) circuit and the like, and outputs data in YUV 4:2:2 format video coding. It should be noted that, in the following description, YUV=X:Y:Z format video coding is described simply as YUVXYZ format.

A scaling circuit 5 sub-samples and performs linear compensation on the YUV422 format image data output by the signal processing circuit 4 to change the size of the image horizontally and/or vertically. A YUV conversion circuit 6 performs color-difference signal interpolation on and sub-sampling of the YUV422 format data for conversion into YUV411 format or YUV420 format. A playback circuit 7 adds modulation and synchronization signals to the image data output by the YUV conversion circuit 6 and DA converts it to generate a video signal. A display unit 8 is, for example, a liquid crystal display monitor, and displays the video signal output by the playback circuit 7.

The output of the signal processing circuit 4 is applied to the scaling circuit 5 and is also supplied to a compression circuit 10. The compression circuit 10 carries out block compression encoding of the YUV422 format image data. It is assumed that JPEG (Joint Photographic Expert Group; a color still image compression method) format encoding is carried out. The compressed image data is recorded onto a recording medium 11 typified by a semiconductor memory by a recording apparatus, not shown.

Overall control of the digital camera is accomplished by a CPU (Central Processing Unit) 12 executing a control program stored in a nonvolatile memory, not shown, using a RAM or other memory, not shown.

The digital camera is provided with input devices (switches, levers, touch panels and the like) for enabling the user to input instructions to the camera, with a release switch 13 and a mode switch 14 comprising part of the input devices.

Figure 2A:
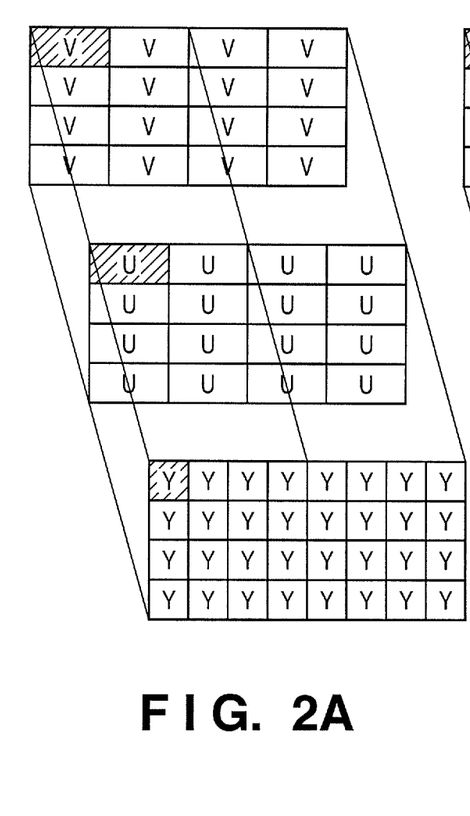
FIGS. 2A-2C are diagrams illustrating image format conversions in a YUV conversion circuit.
Figure 2B:
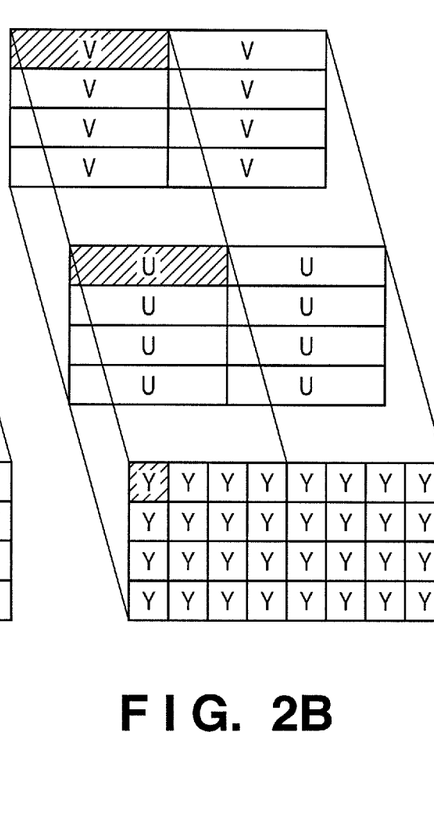
Figure 2C:
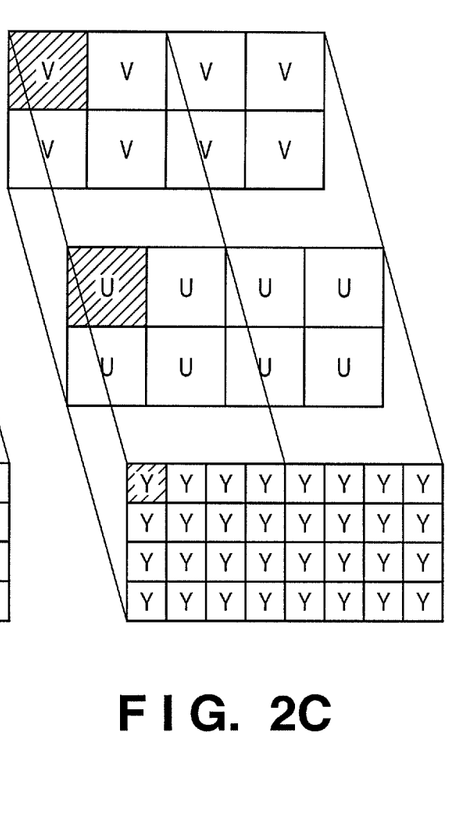

FIGS. 2A-2C are diagrams illustrating image format conversions in a YUV conversion circuit.

FIG. 2A, FIG. 2B and FIG. 2C show the relation between Y (luminance); U (color difference) and V (color difference) in the YUV422, YUV411 and YUV420 formats, respectively.

The YUV422 format is a format that samples the Y at 8 bits per pixel and the U, V at 8 bits averaged every 2 bits, for a data amount of 16 bits/pixel. Both the YUV420 format and the YUV411 format sample the U, V at 8 bits averaged every four bits, for a data amount of 12 bits/pixel.

Figure 4:
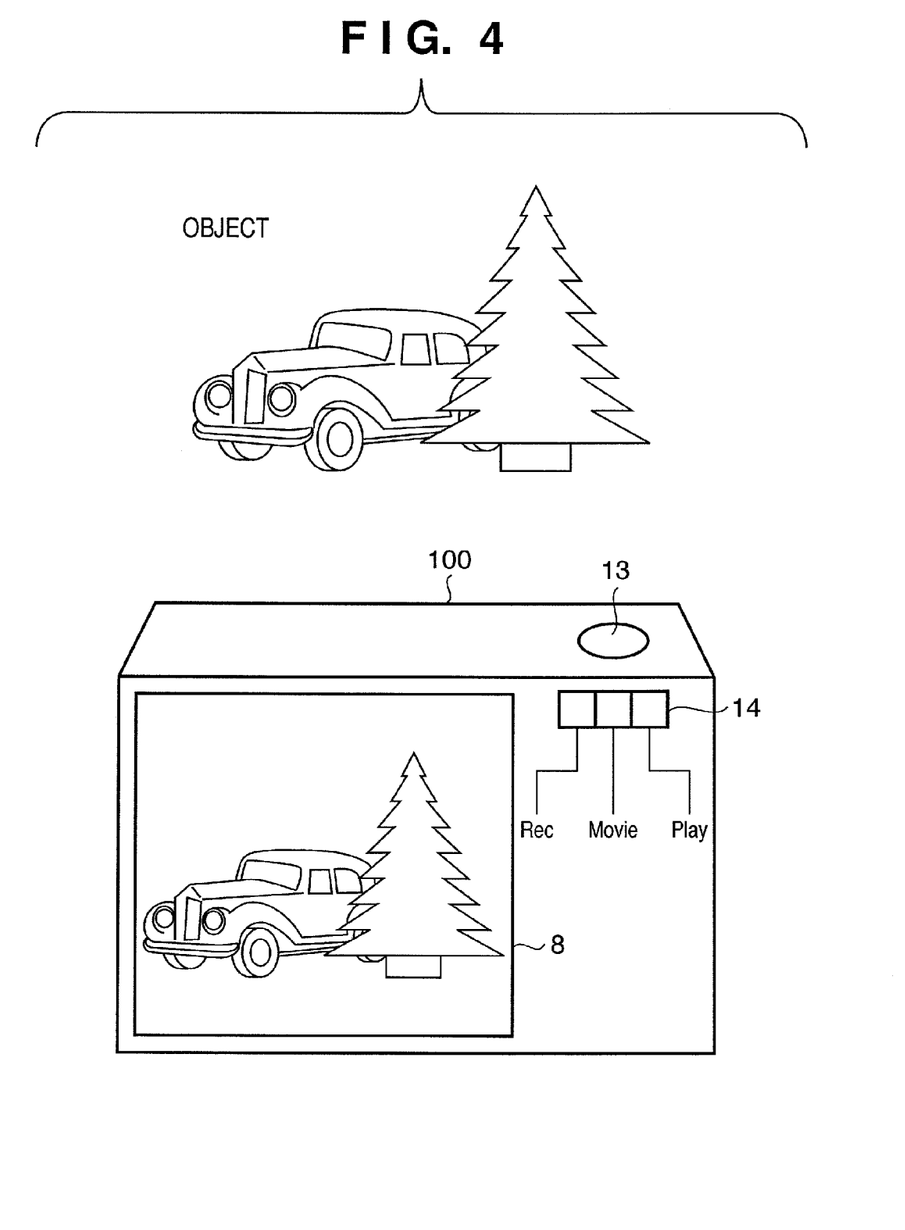
FIG. 4 is a schematic diagram of a state of moving image recording in the digital camera of the present embodiment.

FIG. 4 is a schematic diagram of a state of moving image recording in the digital camera 100 of the present embodiment.

Here, the display unit 8 is made to act as an electronic viewfinder, with an image of the object displayed on the display unit 8 in real time. When the release switch 13 is fully depressed in this state, still image recording or moving image recording starts (or moving image recording ends). The mode switch 14 switches the operating modes of the digital camera 100, and in the present embodiment is capable of setting and switching between a still image sensing mode (REC), a moving image sensing mode (MOVIE) and a playback mode (PLAY).

Figure 3:
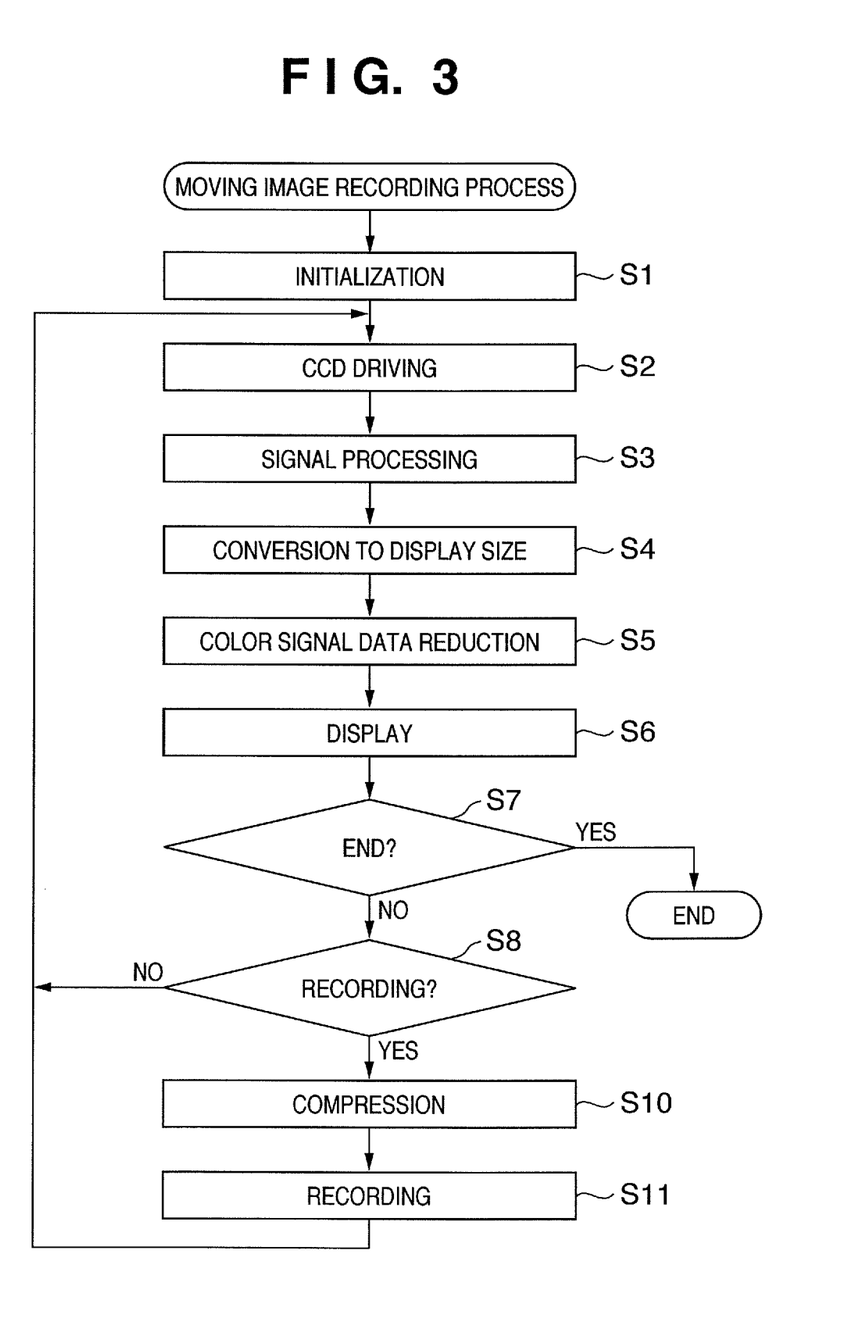
FIG. 3 is a flow chart illustrating a moving image recording process in the digital camera according to the first embodiment of the present invention.

Next, a description will be given of the moving image recording process of the digital camera of the present embodiment, using the flow chart shown in FIG. 3.

If the digital camera 100 is set to the moving image recording mode by the mode switch 14, the CPU 12 carries out the following operations.

In a step S1, the optical system is initialized. In the present embodiment, the image sensing lens 1 is configured so as to be movable along the optical axis by a focus drive unit, not shown. The image sensing device 2 is disposed on the optical axis of the image sensing lens 1. In order to use the display unit 8 as an electronic viewfinder, focus control is then carried out automatically and the sensed image of the object shown in FIG. 4 sensed with the image sensing lens 1 is focused on the image sensing surface of the image sensing device 2.

In a step S2, the image sensing device is driven. In contemporary digital cameras, the number of pixels of the image sensing device 2 exceed the number of pixels that can be displayed on the display unit 8. Therefore, when generating an image for display on the display unit 8, usually a process of reduction is carried out. Here, for the sake of simplicity of explanation, it is assumed that the display unit 8 has a resolution of 640 pixels X 480 lines and that the resolution of the image data output by the image sensing device 2 is the 1024 pixel X 768 lines of XGA (eXtended Graphics Array).

The object image focused on the image sensing surface of the image sensing device 2 is photoelectrically converted by the image sensing device 2 and output as a succession of analog electrical signals. Then, at the A/D converter 3, these analog signals are converted into digital signals. The digitized image signal is then output to the signal processing circuit 4.

Figure 8A:
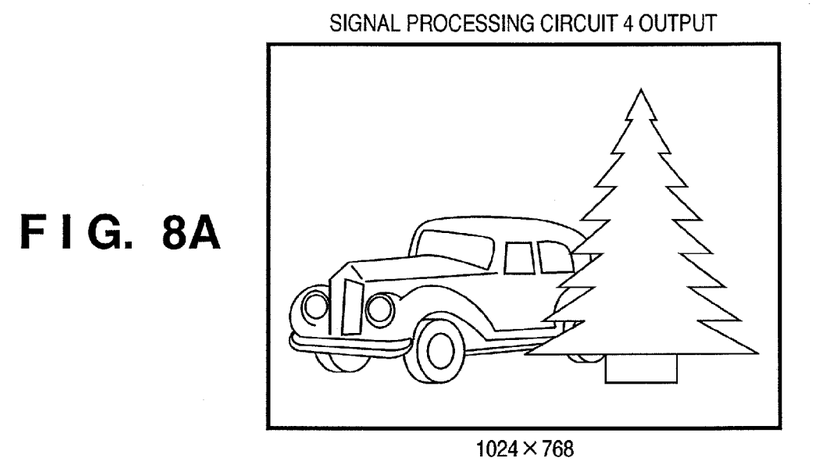
FIGS. 8A-8C are diagrams showing an image sensing size, a recording size and a display size in a digital camera according to the first embodiment of the present invention.

In a step S3, the image signal digitized by the A/D converter 3 is processed by the signal processing circuit 4, which performs white balance adjustment, gamma correction, YC processing and the like to generate image data of the YUV422 format shown in FIG. 2A. An example of such image data is shown in FIG. 8A.

In a step S4, the image data with a resolution of 1024 pixels by 768 lines that is output by the signal processing circuit 4 is sub-sampled and linear compensated by the scaling circuit 5, reducing the image data horizontal and vertically to generate reduced image data (display image data) with a resolution of 640 pixels by 480 lines that is the display unit 8 display size. The reduced image data is shown in FIG. 8C. The reduced image data is then output to the YUV conversion circuit 6.

In a step S5, the 640×480 reduced image data format generated by the scaling circuit 5 is converted from YUV422 format to YUV411 format by the YUV conversion circuit 6. This conversion reduces the reduced image data color signal data (ultimately, the image data size). The converted reduced image data is then output to the playback circuit 7.

In a step S6, the YUV411 format display image data input from the YUV conversion circuit 6 is converted to a TV (television) analog signal by the playback circuit 7 and output to the display unit 8. Specifically, at the playback circuit 7, the display image data is chroma encoded, band corrected and converted into composite signals. By carrying out the processes of from step S2 to step S6 in order, the display unit 8 functions as an electronic viewfinder like that shown in FIG. 4.

In a step S7, the end of the electronic viewfinder process is determined based on detection of the operation of, for example, the mode switch 14, the power switch, or the release switch 13, and ends the process if it should be ended. By contrast, if the process should not end it proceeds to a step S8.

In step S8, whether or not moving image recording has been instructed is determined by whether or not the release switch 13 is ON. In the present embodiment, moving image recording is deemed ordered if the release switch 13 goes ON when there is no moving image recording, and an end to moving image recording is deemed ordered if the release switch 13 goes ON during moving image recording. The digital camera 100 is deemed to be in a moving image recording standby state when the release switch 13 is OFF in a state in which there is no moving image recording.

In step S8, if it is determined that the digital camera 100 is in a state in which the start of moving image recorded is ordered, the process proceeds to a step S10.

In addition, if it is determined that the digital camera 100 is in the moving image recording standby state, the process proceeds to step S2 and the moving image recording standby state (electronic viewfinder process) continues.

Figure 8B:
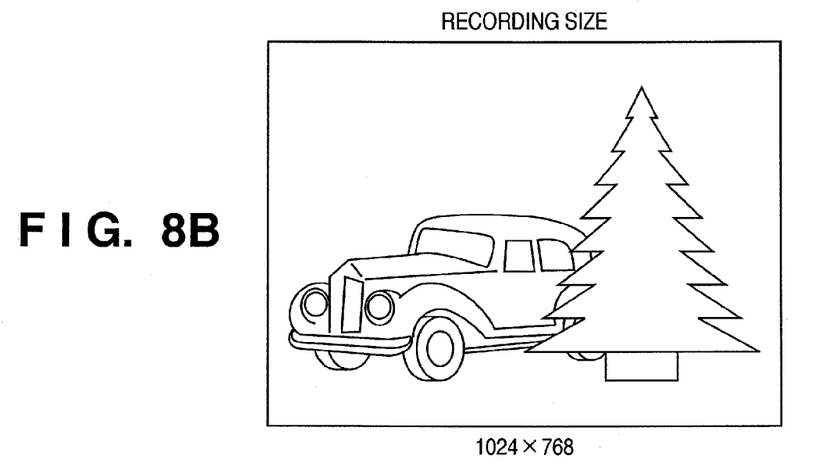
Figure 8C:
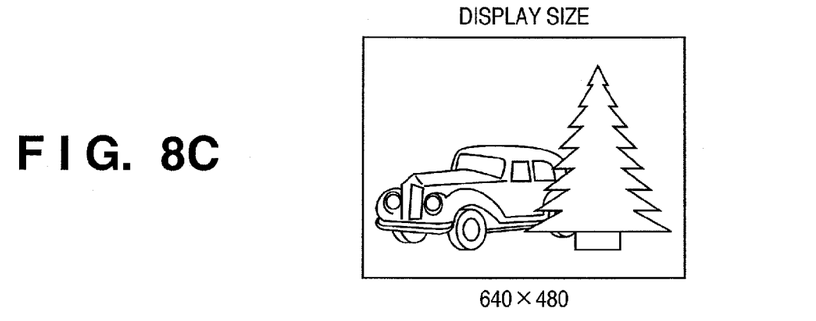

In step S10, the YUV422 format 1024×768 image data shown in FIG. 8B and processed by the signal processing circuit 4 is compressed by the compression circuit 10 using compression encoding such as JPEG format. In other words, the compression circuit 10 converts the raster scan image data output by the signal processing circuit 4 into block scan image data, block encodes it, and outputs JPEG data to the recording medium 11.

In a step S11, the JPEG data output by the compression circuit 10 is recorded on the recording medium 11.

Figure 10:
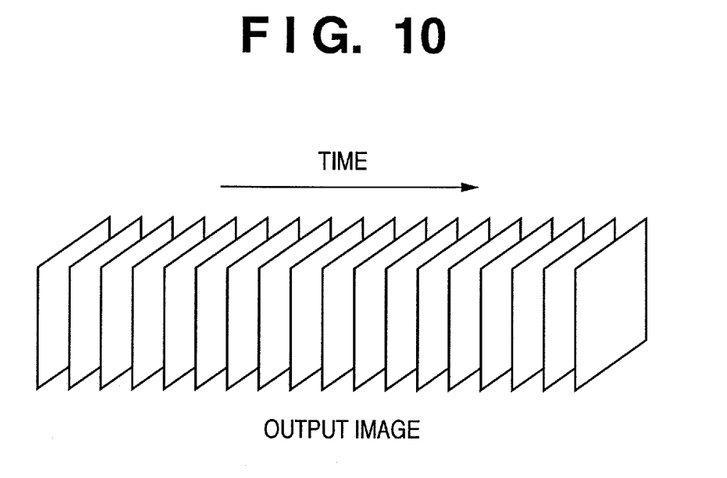
FIG. 10 is a diagram illustrating the format of the moving image data generated by the digital camera according to the embodiments.

Thereafter, steps S1-S11 are repeated until there is a moving image recording pause instruction or an end instruction, when JPEG data is recorded in order on the recording medium 11 while an image continues to be displayed on the image display unit 18 to obtain the moving image data of a format in which still images are arranged in chronological order as shown in FIG. 10.

Thus, as described above, the image processing apparatus according to the present embodiment provides the moving image signal composed of the luminance signal and the color-difference signals having a higher degree of resolution than the display image, and further, carries out moving image recording in which the frames are compression encoded as still images. As a result, when extracting and printing out a given frame from the moving image, higher picture quality results than conventionally can be obtained. In other words, the present invention provides recording at high resolution and a wider color band.

In addition, because the image processing apparatus of the present invention records images in a format composed of luminance and color differences, it is possible obtain a display image easily from the recording image data. Furthermore, because the display image not only has fewer pixels but also color difference reduction, the display process load is light, enabling power consumption to be reduced.

It should be noted that although in the present embodiment the YUV conversion circuit 6 shown in FIG. 1 outputs YUV411 format image data, alternatively the YUV conversion circuit 6 may be configured so as to output image data in YUV420 format. In addition, although the recording size is described as XGA, the recording size is not particularly limited thereto and may be of any size provided that it is greater than the resolution of the display unit 8.

(Second Embodiment)

Next, a description will be given of a second embodiment of the present invention. Whereas in the first embodiment, the image data size output by the signal processing circuit 4=the recording size>display size, in the present embodiment the image data size>recording size>the display size.

Figure 5:
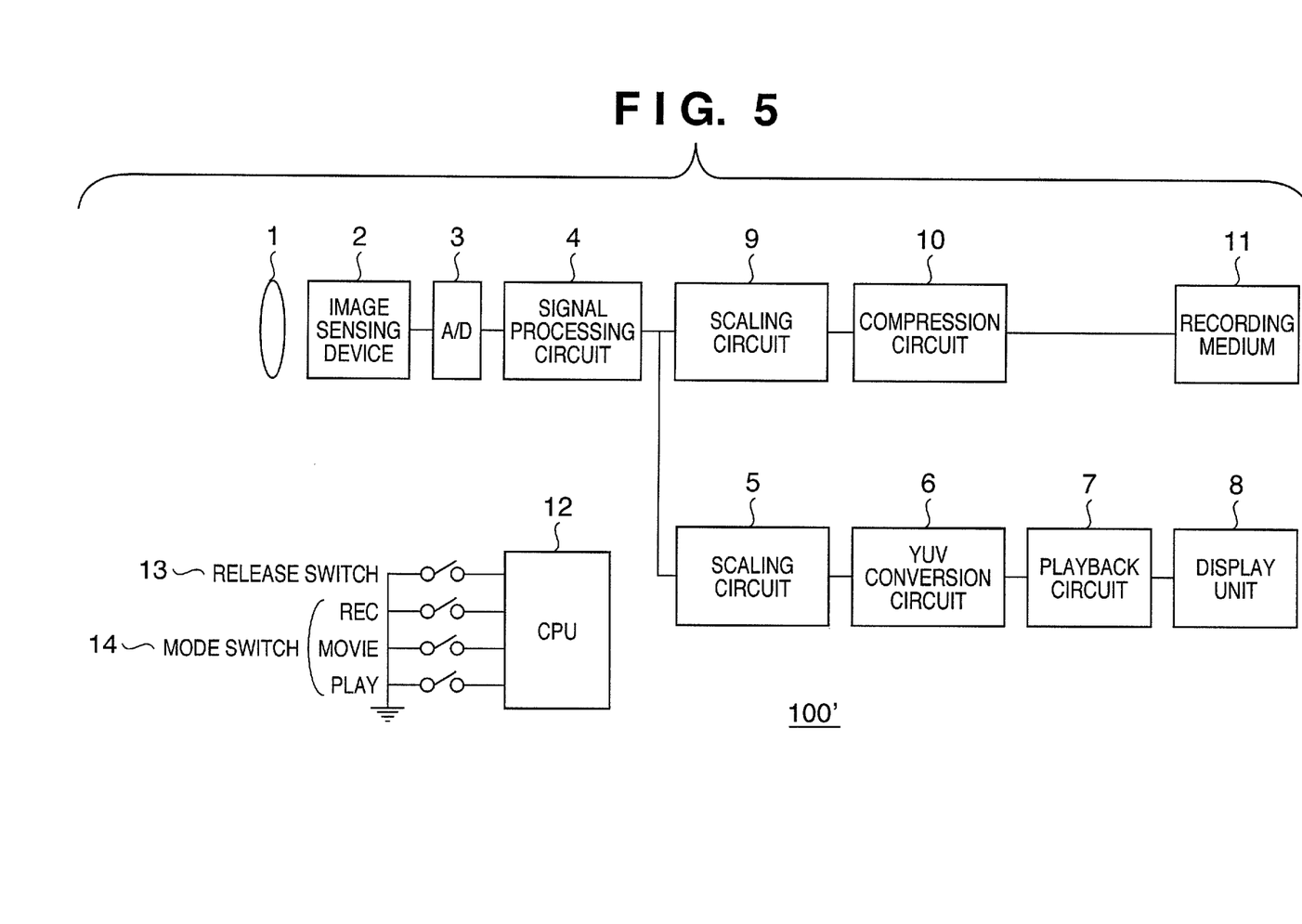
FIG. 5 is a block diagram showing an example of the structure of a digital camera as an image processing apparatus according to a second embodiment of the present invention.

FIG. 5 is a block diagram showing an example of the structure of a digital camera as an image processing apparatus according to the present embodiment. In the diagram, structures that are the same as those shown in the first embodiment are given the same reference characters. As can be seen from a comparison with the first embodiment, with the second embodiment, the only difference is that a second scaling circuit 9 is provided between the signal processing circuit 4 and the compression circuit 10, and therefore a description of those other structures that are the same as those of the first embodiment of the present invention is omitted.

The second scaling circuit 9, like the first scaling circuit 5, changes the size horizontally and vertically of the image data output by the signal processing circuit 4 using sub-sampling, linear compensation and the like.

Next, a description is given of a moving image recording process of the digital camera of the present embodiment. It should be noted that, in FIG. 6 as well, steps that are the same as those of the process shown in FIG. 3 in the description of the first embodiment are given the same reference numerals and a redundant description thereof is omitted here.

Figure 6:
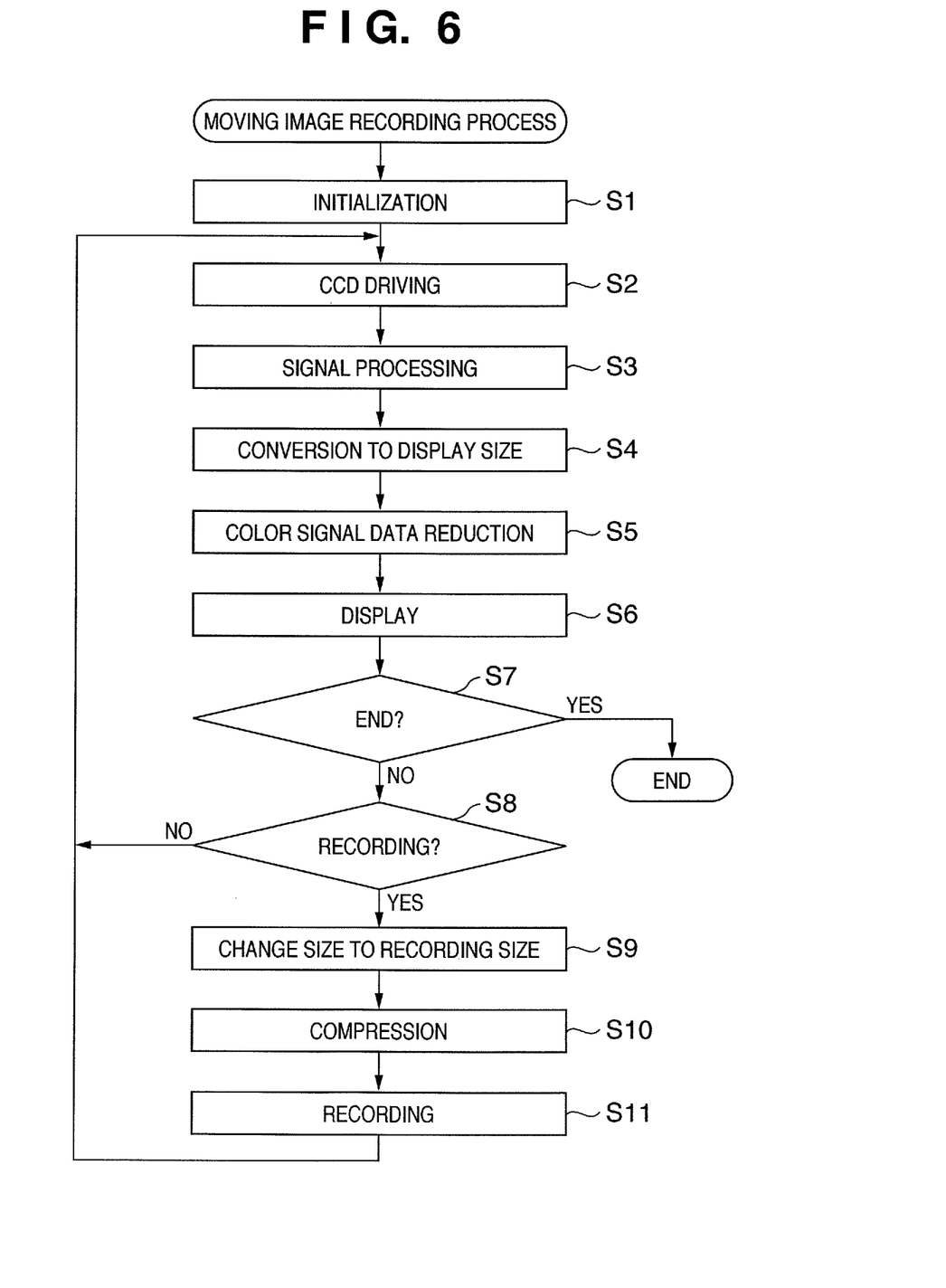
FIG. 6 is a flow chart illustrating a moving image recording process in the digital camera according to the second embodiment of the present invention.

The CPU 12 carries out the process shown in FIG. 6 if the digital camera is set to the moving image sensing mode (MOVIE) by the mode switch 14.

The processes of steps S1-S8 are the same as those of the first embodiment.

Figure 9A:
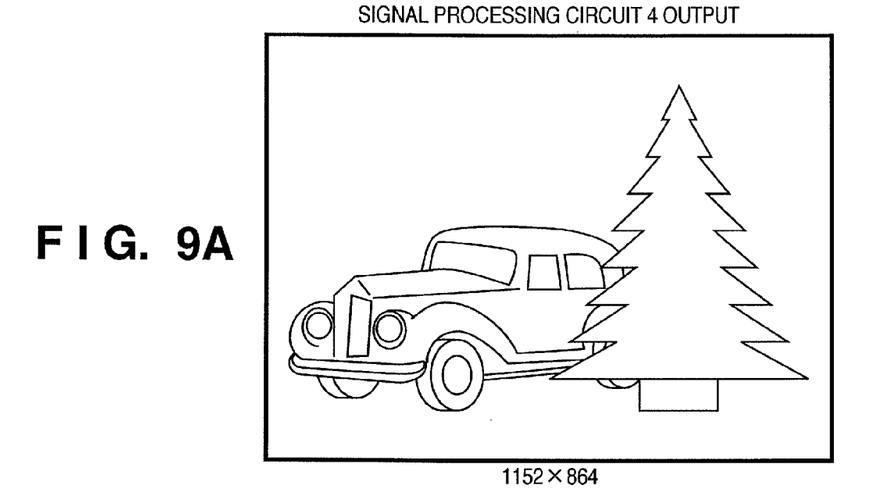
FIGS. 9A-9C are diagrams showing an image sensing size, a recording size and a display size in a digital camera according to the second embodiment of the present invention.
Figure 9B:
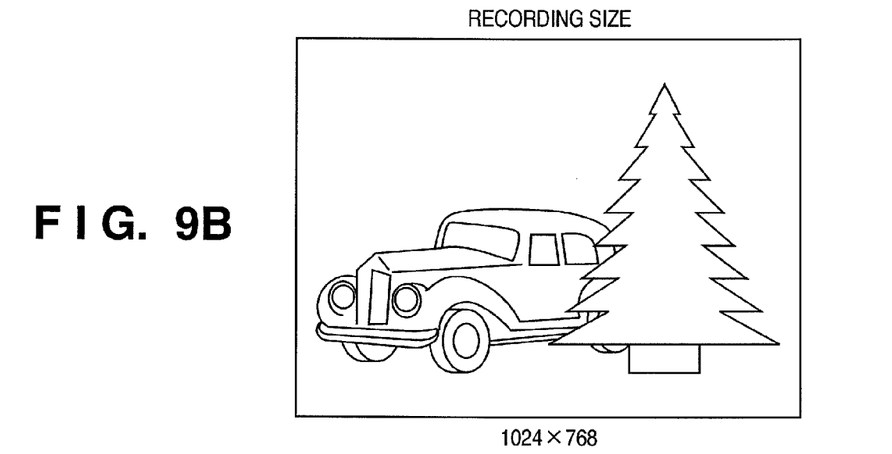
Figure 9C:
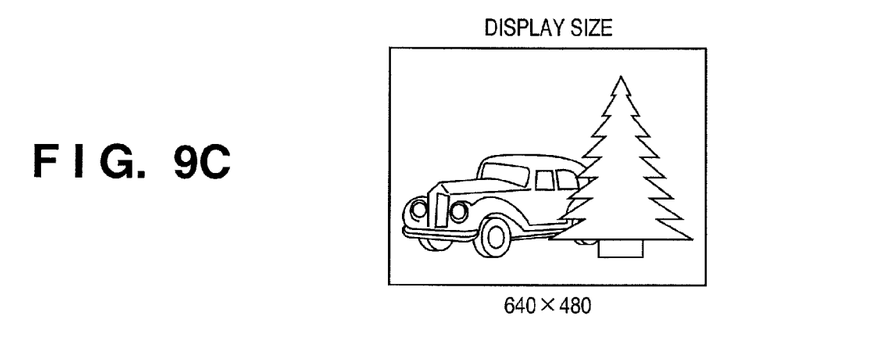

In addition, to facilitate explanation and understanding, in the present embodiment as well, it is assumed that an XGA-size image signal is obtained from the image sensing device 2. In addition, it is assumed that 1152×864 image data like that shown in FIG. 9A is output from the signal processing circuit 4 in YUV422 format. Moreover, it is assumed that the display resolution of the display unit 8 is 640×480 as shown in FIG. 9C. However, unlike in the first embodiment, the recording size is assumed to be the 1024×768 resolution shown in FIG. 9B.

In step S8, when it is determined that the start of moving image recording has been ordered, the process proceeds to a step S9.

In step S9, the YUV422 format, 1152×864 image data output by the signal processing circuit 4 is changed to the recording size by the second scaling circuit 9. In other words, the second scaling circuit 9 shrinks the image data horizontally and vertically by applying sub-sampling, linear compensation and so forth, to the sensed image data. The second scaling circuit 9 then generates the YUV422 format, 1024×768 reduced image data (recording image data) shown in FIG. 9B and outputs the recording image data to the compression circuit 10.

In step S10, the recording image data generated by the second scaling circuit 9 is compression encoded frame by frame by the compression circuit 10. In the present embodiment as well, as with the first embodiment, the compression circuit 10 carries out block compression encoding (specifically, JPEG encoding). The compression circuit 10 converts the raster scan image data into block scan image data, block encodes it, and outputs JPEG data to the recording medium 11.

In step S11, the JPEG data compressed by the compression circuit 10 is recorded on the recording medium 11.

Thereafter, steps S1-S11 are repeated and JPEG data is recorded in order on the recording medium 511 while an image continues to be displayed on the image display unit 18 to obtain the moving image data shown in FIG. 10.

Thus, as described above, the same effect as with the first embodiment can be obtained with this second embodiment as well. In addition, even if the recording size is smaller than the image sensing size (the image sensing size is greater than the recording size), it is still possible to display on the display unit and to record.

In the present embodiment as well, it should be noted that although the YUV conversion circuit 6 outputs YUV411 format image data, alternatively the YUV conversion circuit 6 may be configured so as to output image data in YUV420 format. In addition, although the recording size is XGA, the recording size is not particularly limited thereto and may be of any size provided that it is greater than the resolution of the display unit 8.

(Variation of the Second Embodiment)

Figure 7:
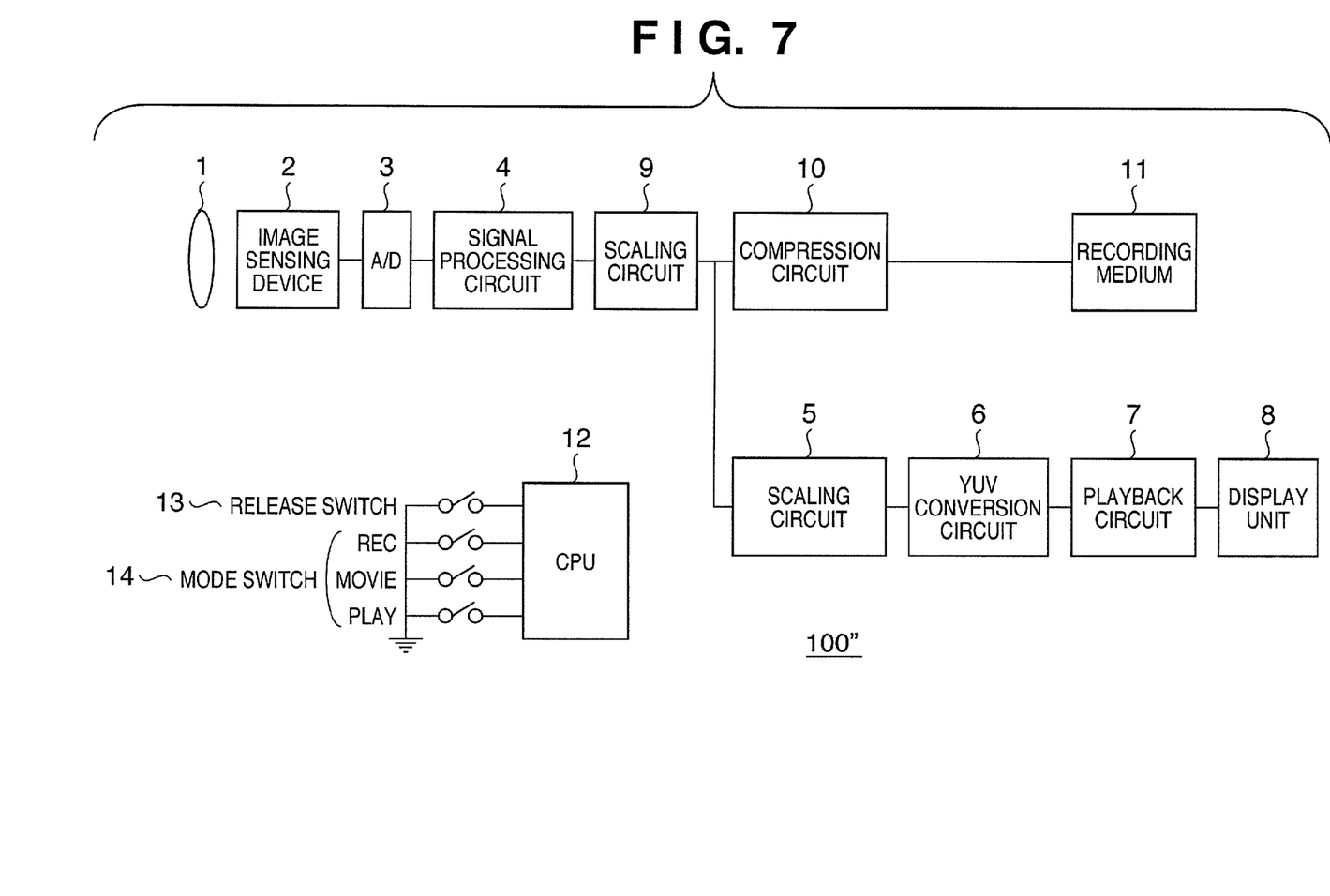
FIG. 7 is a block diagram showing a system structure of the image processing apparatus according to a variation of the second embodiment of the present invention.

In the second embodiment, the signal processing circuit 4 image signal shown in FIG. 5 is output to a first scaling circuit 505 and a second scaling circuit 509. However, alternatively, as shown in FIG. 7, the image sensing size YUV422 format image data output by the signal processing circuit 4 may first be changed to the recording size by the second scaling circuit 9. In this case, the output of the second scaling circuit 9 is output to the first scaling circuit 5 and the compression circuit 10 710. Therefore, the first scaling circuit 5 further changes the recording size image data to the display size.

(Other Embodiments)

It should be noted that the present invention also includes an instance in which a software program that implements the capabilities of the embodiments described above is supplied by wire or wireless communications to a shading correction apparatus or an image sensing apparatus having a computer capable of executing such program, and the same capabilities are achieved by the image sensing apparatus executing such supplied program.

Accordingly, since the functional processes of the present invention are implemented by a computer of an apparatus having a shading correction capability, the program supplied to and installed in the computer itself also accomplishes the present invention. In other words, the computer program for implementing the functional processes of the invention is itself also included within the scope of the present invention.

In that case, so long as the system or apparatus has the capabilities of the program, the program may be executed in any form, such as an object code, a program executed by an interpreter, or scrip data supplied to an operating system.

Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a non-volatile semiconductor memory or the like.

As for the method of supplying the program using wire/wireless communications, there is, for example, a method in which a data file (program data file), either a computer program itself that forms the invention or a file or the like that is compressed and automatically installed, and capable of becoming the computer program that comprises the invention on a client computer, is stored on a server on a computer network, and the program data file is downloaded to a connected client computer. In this case, the program data file may be divided into a plurality of segment files and the segment files distributed among different servers.

In other words, a server device that downloads program data files that implement the functional processes of the present invention by computer to multiple users is also covered by the claims of the present invention.

It is also possible to encrypt and store the program of the present invention on a storage medium such as a CD-ROM, distribute the storage medium to users, allow users who meet certain requirements to download decryption key data from a website via the Internet, and allow these users to decrypt the encrypted program by using the key data, whereby the program is installed in the user computer.

Besides the cases where the aforementioned functions according to the embodiments are implemented by executing the read program by computer, an operating system or the like running on the computer may perform all or a part of the actual processing, so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or part of the actual processing so that the functions of the foregoing embodiment can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-159939 filed on May 31, 2005, which is hereby incorporated by reference herein in its entirety.

What is claimed is:

1. An image processing apparatus for recording a moving image, said image processing apparatus comprising:
a signal processing unit configured to convert an input moving image signal into first image data composed of (a) a luminance signal and (b) a color-difference signal, and to output the first image data;

a conversion unit configured to convert the first image data into second image data having a reduced ratio of color-difference signal data amount to luminance signal data amount per predetermined numbers of pixels as compared to that of the first image data, and to output the second image data as image data for display;

a compressing unit configured to compress the first image data by a predetermined compressing method and to output the compressed image data, wherein said compressing unit does not receive the second image data output from said conversion unit; and a recording unit configured to record the compressed image data compressed by said compressing unit as moving image data on a recording medium, wherein (a) the compression by said compressing unit to output the compressed image data for recording by said recording unit, and (b) the conversion by said conversion unit to output the second image data for display, are performed in association with the same first image data in parallel, and wherein for the second image data, the ratio of the color-difference signal data amount to the luminance signal data amount per predetermined numbers of pixels is less than that of the first image data.

2. The image processing apparatus according to claim 1, wherein the first image data is in a YUV4:2:2 format and the second image data is in a YUV4:1:1 or YUV4:2:0 format.

3. The image processing apparatus according to claim 1, further comprising a first scaling unit configured to change the first image data into a predetermined display size containing fewer pixels than the first image data, wherein said conversion unit converts the first image data after scaling into second image data having a reduced color-difference signal data amount.

4. The image processing apparatus according to claim 3, further comprising a second scaling unit configured to change the first image data into a size for recording containing fewer pixels than the input moving image signal, wherein said compressing unit compresses the first image data of the size for recording.

5. The image processing apparatus according to claim 4, wherein said first scaling unit changes the size of the first image data of the size for recording to the predetermined display size.

6. The image processing apparatus according to claim 1, wherein said image processing apparatus is a digital camera having a display monitor, and wherein said conversion unit outputs the second image data to the display monitor.

7. The image processing apparatus according to claim 6, wherein in the event that a user's operation is input during the time when the second image data is output to the display monitor in a movie capturing mode of said digital camera, said compressing unit and said recording unit start to compress the first image data and to record the compressed image data, respectively.

8. An image processing method for recording a moving image, said image processing method comprising:

a signal processing step of converting an input moving image signal into first image data composed of (a) a luminance signal and (b) a color-difference signal, and outputting the first image data;

a conversion step of converting the first image data into second image data having a reduced ratio of color-difference signal data amount to luminance signal data amount per predetermined numbers of pixels compared to that of the first image data, and outputting the second image data as image data for display, a compressing step of compressing the first image data by a compressing method and outputting the compressed image data, wherein said compressing step does not receive the second image data output from said conversion step;

a recording step of recording the compressed image data compressed by said compressing step as moving image data on a recording medium, wherein (a) said compression by said compressing step to output the compressed image data for recording by said recording step, and (b) said conversion by said conversion step to output the second image data for display, are performed in association with the same first image data in parallel, and wherein for the second image data, the ratio of the color-difference signal data amount to the luminance signal data amount per predetermined numbers of pixels of the second image data is less than that of the first image data.

9. The image processing method according to claim 8, wherein the first image data is in a YUV4:2:2 format and the second image data is in a YUV4:1:1 or YUV4:2:0 format.

10. The image processing method according to claim 8, further comprising a first scaling step of changing the first image data to a predetermined display size containing fewer pixels than the first image data, wherein said conversion step converts the first image data after scaling into second image data having a reduced color-difference signal data amount.

11. The image processing method according to claim 10, further comprising a second scaling step of changing the first image data into a size for recording containing fewer pixels than the input moving image signal, wherein said compressing step compresses the first image data of the size for recording.

12. The image processing method according to claim 11, wherein said first scaling step changes a size of the first image data of the size for recording to the predetermined display size.

13. The image processing method according to claim 8, wherein said image processing method is performed in a digital camera having a display monitor, and wherein said conversion step outputs the second image data to the display monitor.

14. The image processing method according to claim 13, wherein in the event that a user's operation is input during the time that the second image data is output to the display monitor in a movie capturing mode of the digital camera, said compressing step and said recording step start to compress the first image data and to record the compressed image data, respectively.

15. An image processing apparatus for recording a moving image, said image processing apparatus comprising:

a signal processing unit configured to convert an input moving image signal into YUV4:2:2 format data and to output the YUV4:2:2 format data;

a conversion unit configured to convert the YUV4:2:2 format data into YUV4:1:1 format data, and to output the YUV4:1:1 format data as image data for display;

a compressing unit configured to compress the YUV4:2:2 format data by a predetermined compressing method and to output the compressed image data, wherein said compressing unit does not receive the YUV4:1:1 format data output from said conversion unit; and a recording unit configured to record the compressed image data compressed by said compressing unit as moving image data on a recording medium, wherein (a) the compression by said compressing unit to output the compressed image data for recording by said recording unit, and (b) the conversion by said conversion unit to output the second image data for display, are performed in association with the same YUV4:2:2 format data in parallel.

16. The image processing apparatus according to claim 15, further comprising a first scaling unit configured to change the YUV4:2:2 format data into a predetermined display size containing fewer pixels than the YUV4:2:2 format data, wherein said conversion unit converts the YUV4:2:2 format data after scaling into YUV4:1:1 format data.

17. An image processing apparatus for recording a moving image, said image processing apparatus comprising:

a signal processing unit configured to convert an input moving image signal into YUV4:2:2 format data and to output the YUV4:2:2 format data;

a conversion unit configured to convert the YUV4:2:2 format data into YUV4:2:0 format data, and to output the YUV4:2:0 format data as image data for display;

a compressing unit configured to compress the YUV4:2:2 format data by a predetermined compressing method and to output the compressed image data, wherein said compressing unit does not receive the YUV4:2:0 format data output from said conversion unit; and a recording unit configured to record the compressed image data compressed by said compressing unit as moving image data on a recording medium, wherein (a) the compression by said compressing unit to output the compressed image data for recording by said recording unit, and (b) the conversion by said conversion unit to output the second image data for display, are performed in association with the same YUV4:2:2 format data in parallel.

18. The image processing apparatus according to claim 17, further comprising a first scaling unit configured to change the YUV4:2:2 format data into a predetermined display size containing fewer pixels than the YUV4:2:2 format data, wherein said conversion unit converts the YUV4:2:2 format data after scaling into YUV4:2:0 format data.

19. An image processing method for recording a moving image, said image processing method comprising:

a signal processing step of converting an input moving image signal into YUV4:2:2 format data and outputting the YUV4:2:2 format data;

a conversion step of converting the YUV4:2:2 format data into YUV4:1:1 format data, and outputting the YUV4:1:1 format data as image data for display;

a compressing step of compressing the YUV4:2:2 format data by a compressing method and outputting the compressed image data, wherein said compressing step does not receive the YUV4:1:1 format data output from said conversion step; and a recording step of recording the compressed image data compressed by said compressing step as moving image data on a recording medium, wherein (a) said compression by said compressing step to output the compressed image data for recording by said recording step, and (b) said conversion by said conversion step to output the second image data for display, are performed in association with the same YUV4:2:2 format data in parallel.

20. The image processing method according to claim 19, further comprising a first scaling step of changing the YUV4:2:2 format data to a predetermined display size containing fewer pixels than the YUV4:2:2 format data, wherein said conversion step converts the YUV4:2:2 format data after scaling into YUV4:1:1 format data having a reduced color-difference signal data amount.

21. An image processing method for recording a moving image, said image processing method comprising:

a signal processing step of converting an input moving image signal into YUV4:2:2 format data and outputting the YUV4:2:2 format data;

a conversion step of converting the YUV4:2:2 format data into YUV4:2:0 format data, and outputting the YUV4:2:0 format data as image data for display;

a compressing step of compressing the YUV4:2:2 format data by a compressing method and outputting the compressed image data, wherein said compressing step does not receive the YUV4:2:0 format data output from said conversion step; and a recording step of recording the compressed image data compressed by said compressing step as moving image data on a recording medium, wherein (a) said compression by said compressing step to output the compressed image data for recording by said recording step, and (b) said conversion by said conversion step to output the second image data for display, are performed in association with the same YUV4:2:2 format data in parallel.

22. The image processing method according to claim 21, further comprising a first scaling step of changing the YUV4:2:2 format data to a predetermined display size containing fewer pixels than the YUV4:2:2 format data, wherein said conversion step converts the YUV4:2:2 format data after scaling into YUV4:2:0 format data having a reduced color-difference signal data amount.

* * * * *